(12) United States Patent
Osborn (10) Patent No.: US 11,572,534 B2
(45) Date of Patent: Feb. 7, 2023

(54) SYSTEM FOR CONTROLLING THE CONCENTRATION OF SINGLE AND MULTIPLE DISSOLVED GASES IN BEVERAGES

(71) Applicant: Board of Trustees of the University of Arkansas, Little Rock, AR (US)

(72) Inventor: Gregory Scott Osborn, Fayetteville, AR (US)

(73) Assignee: Board of Trustees of the University of Arkansas, Little Rock, AR (US)

(*) Notice: Subject to any disclaimer, the term of this patent is extended or adjusted under 35 U.S.C. 154(b) by 106 days.

(21) Appl. No.: 17/188,467

(22) Filed: Mar. 1, 2021

(65) Prior Publication Data

US 2021/0179983 A1    Jun. 17, 2021

Related U.S. Application Data

(63) Continuation of application No. 15/998,806, filed on Aug. 16, 2018, now Pat. No. 10,961,488, which is a
(Continued)

(51) Int. Cl.
*C12C 11/11*        (2019.01)
*B01F 3/04*         (2006.01)
(Continued)

(52) U.S. Cl.
CPC .......... *C12C 11/11* (2013.01); *B01F 23/2341* (2022.01); *B01F 23/2362* (2022.01);
(Continued)

(58) Field of Classification Search
CPC ................. C12C 11/11; B01F 23/2363; B01F 23/2362; B01F 23/2341; B01F 23/237621;
(Continued)

(56) References Cited

U.S. PATENT DOCUMENTS 5,569,180 A * 10/1996 Spears ................. A61K 9/5089
                                                   604/24
5,730,935 A *  3/1998 Spears ................... D21C 9/147
                                                   604/24
(Continued)

FOREIGN PATENT DOCUMENTS

WO        2015168133 A1    11/2015

*Primary Examiner* — Anthony J Weier
(74) *Attorney, Agent, or Firm* — Richard Blakely Glasgow (57) ABSTRACT

A system and method of controlling a concentration of one or more gases dissolved in a beverage is shown. The system includes a saturation tank having a gas head space, a brite tank, and a beverage supply system to pass the beverage between the saturation tank and the brite tank. A beverage supersaturated with the gas from the head space is formed in the saturation tank. The supersaturated beverage is passed from the saturation tank to the brite tank. Once the amount of gas added to the beverage exceeds saturation, some of the gas escapes from solution from the beverage and the pressure in the brite tank increases. Once the pressure within the brite tank reaches a pre-defined pressure, a pump supplying the beverage to the saturation tank is shut-off and the inlet and outlet valves of the brite tank are closed.

18 Claims, 8 Drawing Sheets

Related U.S. Application Data continuation-in-part of application No. 15/130,262, filed on Apr. 15, 2016, now Pat. No. 10,077,418.

(60) Provisional application No. 62/147,660, filed on Apr. 15, 2015.

(51) Int. Cl.
| | |
|---|---|
| *B01F 15/00* | (2006.01) |
| *B01F 5/10* | (2006.01) |
| *B01F 23/234* | (2022.01) |
| *B01F 23/236* | (2022.01) |
| *B01F 25/53* | (2022.01) |
| *B01F 35/21* | (2022.01) |
| *B01F 23/237* | (2022.01) |
| *B01F 101/15* | (2022.01) |

(52) U.S. Cl.
CPC ......... *B01F 23/2363* (2022.01); *B01F 25/53* (2022.01); *B01F 35/2113* (2022.01); *B01F 23/23765* (2022.01); *B01F 23/237621* (2022.01); *B01F 2101/15* (2022.01)

(58) Field of Classification Search
CPC ............... B01F 23/23765; B01F 25/53; B01F 35/2113; B01F 2101/15
See application file for complete search history.

(56) References Cited

U.S. PATENT DOCUMENTS

| | | | |
|---|---|---|---|
| 10,077,418 B2* | 9/2018 | Osborn | B01F 23/2363 |
| 10,252,226 B2 | 4/2019 | Milligan | |
| 10,961,488 B2* | 3/2021 | Osborn | B01F 23/2363 |
| 2009/0130278 A1* | 5/2009 | Murota | A23F 5/243 |
| | | | 99/323.1 |
| 2018/0338509 A1* | 11/2018 | Carmichael | A23C 9/154 |

* cited by examiner

SYSTEM FOR CONTROLLING THE CONCENTRATION OF SINGLE AND MULTIPLE DISSOLVED GASES IN BEVERAGES

CROSS-REFERENCE TO RELATED APPLICATIONS

This application is a continuation application of, and claims the benefit of, U.S. patent application Ser. No. 15/998,806, now U.S. Pat. No. 10,961,488, entitled "Method for Controlling the Concentration of Single and Multiple Dissolved Gases in Beverages" and filed on Aug. 16, 2018, which is a continuation-in-part application of, and claims the benefit of, U.S. patent application Ser. No. 15/130,262, now U.S. Pat. No. 10,077,418, entitled "Method for Improved Rate and Control of Beverage Carbonation with Automatic Shut-Off" and filed on Apr. 15, 2016, which claims the benefit of U.S. Provisional Application No. 62/147,660, entitled "Apparatus and Method for Improved Rate and Control of Beverage Carbonation with Automatic Shut-Off" and filed on Apr. 15, 2015. The complete disclosure of said applications is hereby incorporated by reference.

STATEMENT REGARDING FEDERALLY SPONSORED RESEARCH OR DEVELOPMENT

Not applicable

BACKGROUND OF THE INVENTION

The current method for dissolving carbon dioxide ($CO_2$) into beer is to place diffusers at the bottom of a pressurized carbonation tank and bubble $CO_2$ gas through the diffusers into the beer. The gas dissolves into the beer as the bubbles rise through the beer. A gas headspace is maintained at the top of the carbonation tank above the beer to collect and vent undissolved $CO_2$. The source of the $CO_2$ is typically commercially purchased storage dewars containing liquid $CO_2$. The $CO_2$ is vaporized into a gas and pressurized. Approximately half or more of the gas passing through the beer does not dissolve and is vented to the air outside the carbonation tank. When $CO_2$ gas is added to the carbonation tank, the $CO_2$ that is dissolved does not add volume to the tank and therefore does not increase pressure inside the carbonation tank. $CO_2$ gas that is not dissolved will add volume to the tank and will increase pressure in the tank if not vented. Therefore, when using the current carbonation method, the carbonation tank must be continually vented to maintain the desired pressure. The pressure in the carbonation tank is used to control the final, saturated dissolved $CO_2$ content of the beer. As the pressure of the gas and beer is increased, the beer can hold more dissolved $CO_2$. Dissolved $CO_2$ content is an important quality parameter for beer to provide the fizz, proper mouth feel, and flavor. Typical carbonation tank pressures range from 10 to 15 psi gauge and this allows the beer to increase $CO_2$ concentration from typically 1 vol $CO_2$/volume beer to 2.5 to 3 vol $CO_2$/volume beer (vol/vol). Undissolved $CO_2$ exiting the carbonation tank is a wasted cost, can increase the $CO_2$ concentration in the building which creates a health hazard and requires additional cost for ventilation, and also adds to the greenhouse gas carbon footprint of the process. Also, the gas headspace at the top of the carbonation tank can allow oxygen from air into the tank upon initially filling the carbonation tank with beer. This oxygen can have detrimental effects on beer quality and reduce shelf life of packaged beer. The rate that the $CO_2$ dissolves into the beer depends on the $CO_2$ gas transferring from the bubble to the beer and varies greatly with the type of beer being carbonated, bubble size, pressure, and desired final $CO_2$ content. These parameters can change from batch to batch. It would therefore be desirable to develop an apparatus and method of carbonating beverages that overcomes these drawbacks.

Dissolving nitrogen gas in beverages imparts a different flavor and mouth feel than carbonation. Nitrogen gas is far less soluble in a water-based beverage than carbon dioxide. Because of this, there is usually far less dissolved nitrogen gas than carbon dioxide in beverages. When a beverage package is sealed, the pressure inside is elevated causing dissolved gas to remain in solution. When the package is opened, the pressure is reduced to that of the surrounding atmosphere resulting in dissolved gas exiting solution as bubbles. When nitrogen gas exits solution, it does so much more slowly than carbon dioxide and the nitrogen bubbles that form are much smaller than carbon dioxide bubbles as a result. The smaller nitrogen bubbles create a "creamy" sensation when the beverage is consumed. Also, nitrogen bubbles do not impart an acidic, sharp sensation because the nitrogen gas does not react with the beverage. When carbon dioxide is dissolved in water-based beverages, carbonic acid is formed, which creates an acidic flavor. The small nitrogen bubbles enhance the perceived thickness of the beverage, provide a lighter appearance in darker beverages, such as stout beer and coffee, and create a foam head with different characteristics than when only carbon dioxide is dissolved.

Dissolving nitrogen gas into beer is typically done in combination with carbon dioxide gas. The ratio of dissolved carbon dioxide and nitrogen gas can give the brewer a tool to control flavor and mouth feel of the brew. This ability to create different flavors and sensations is crucial for craft brewers who seek to create unique experiences and are constantly attempting to create new beers. Nitrogenating coffee has also recently become popular to create a packaged cold coffee beverage.

Because nitrogen gas is much less soluble in water-based beverages than carbon dioxide, the pressure required to dissolve nitrogen gas to the same concentration as carbon dioxide gas is much greater. For example, according to Henry's Law relating gas pressure to dissolved concentration at equilibrium, in order to dissolve carbon dioxide into beer to a typical concentration of 2.2 vol/vol (liters of carbon dioxide per liter of beer) at a temperature of 1° C., a gas partial pressure of 1.43 atmospheres (absolute) is required. For nitrogen gas to reach the same dissolved concentration, a pressure of 110 atmospheres (absolute) is required or 77 times greater pressure than required for dissolving carbon dioxide. In order to maintain the gas in a dissolved state in the beer, this pressure must be maintained in the package (can, bottle or keg) and this pressure increases as the temperature of the package increases. Typical packages of beer at room temperature (20° C.) have a pressure around 2 atmospheres (absolute) and cannot sustain pressure much more than 8 atmospheres (absolute). Because of its high pressure requirement, the amount of nitrogen dissolved in beer is substantially less than carbon dioxide. In a typical nitrogenated beer, both nitrogen and carbon dioxide are dissolved with a concentration of 0.016 vol nitrogen/vol beer and 1.2 vol carbon dioxide/vol beer. This requires a partial pressure of 0.78 atmospheres for both nitrogen and carbon dioxide for a total pressure of 1.56 atmospheres (absolute), which is slightly greater than the package pressure of beers with dissolved carbon dioxide only.

Using typical force carbonation methods where gas is bubbled through the beer in a brite tank, nitrogenated beer is achieved by using a gas mixture of carbon dioxide and nitrogen. The ratio of carbon dioxide to nitrogen in the gas mixture determines the ratio of the gases dissolved in the beer. Brewers use the dissolved gas ratio to control flavor and mouth feel of the beer and create flavor experiences for consumers. This ability is very important in the craft brewing industry where the creation of unique beers is the art form that attracts customers. Using force bubbling to dissolve gases in the beer limits dissolved gas ratios to those commercially available and thereby limits brewers to only a few choices. Custom gas mixtures are more expensive than the standard ones available and are typically not used by craft brewers. Having a tool to be able to control ratios of gases dissolved in beer would be valuable for craft brewers allowing them to create unique beers based on experimentation and optimization. It would therefore be desirable to develop an apparatus and method of controlling ratios of gases dissolved in beverages that overcomes these drawbacks.

BRIEF SUMMARY OF THE INVENTION

The present invention is directed to an improved method and apparatus for carbonating beverages that improves operational efficiency by providing a consistent and faster carbonation, and includes an automatic shut-off and alert once carbonation has reached the desired level. The carbonation process may be completely automated for reduced operator input, improved operational efficiency, and consistent quality of the final product. The present invention also utilizes far less carbon dioxide gas than existing methods, which reduces operating costs and the amount of carbon dioxide released into the atmosphere, thereby lowering the carbon footprint of the user. The present apparatus and method was developed for carbonation of beer and is discussed in the context of beer carbonation below, however, it can also be used for carbonating, nitrogenating, or oxygenating a beverage, or in any other process for adding a dissolved gas to a beverage. This invention could also be used to add dissolved gases such as oxygen, nitrogen, ozone, chlorine, carbon dioxide, argon, carbon monoxide to other liquids such as drinking water, wastewater, environmental water, gasoline and other liquid petroleum products, water containing cells and other organisms for bioprocessing applications such as production of enzymes, proteins, and other products of suspended organisms, food liquids and emulsions.

The present invention is also directed to an improved method and apparatus for controlling ratios of multiple dissolved gases in beverages, such as carbon dioxide and nitrogen.

These and other features, objects and advantages of the present invention will become better understood from a consideration of the following detailed description of the preferred embodiments in conjunction with the drawings as described following:

DETAILED DESCRIPTION OF THE INVENTION

With reference to FIGS. 1-8, the preferred embodiments of the present invention may be described. This invention is directed to a system 20 that connects to the sampling or other port 40 of a carbonation tank for portable use or can be permanently installed into a carbonation tank. The carbonation process begins with the operator setting the desired final carbonation value in volume $CO_2$ per volume beer and the beer temperature. Brewers commonly know and can measure these values. This vol/vol setpoint is then used to automatically determine the pressure setpoint in the carbonation tank by using an equation developed by the inventor for converting standard beer saturation tables into an algorithm for use by any typical Programmable Logic Controller (PLC) that monitors process information and uses computer algorithms to activate equipment to control the process. To start the process, the PLC activates valves and pumps to completely fill the carbonation tank 10 (also referred to as a brite tank) with beer with little or no gas headspace. This process also can perform the following steps to control the carbonation process if the carbonation tank is filled such that a headspace is present, but the advantage of not allowing oxygen into the carbonation tank and beer may be lost. This process can be completed manually by determining the pressure set point from the equation or tables and manually filling the carbonation tank with beer. The carbonation apparatus of the present invention is then activated and a pump or similar liquid moving device extracts a stream of beer from the carbonation tank port 40 and passes it through a process to dissolve carbon dioxide gas into the beer at the desired concentration, which is in excess of the $CO_2$ concentration in the beer in the carbonation tank, without remaining bubbles contained in the beer. As one example, the pump or similar liquid moving device 12 may pass the stream of beer into a pressure chamber 14 (also referred to as a saturation tank) filled with $CO_2$ gas. As a result, the beer stream is contacted by the pressurized $CO_2$ to supersaturate the beer to the desired concentration far in excess of the $CO_2$ concentration in the beer in the carbonation tank.

In alternative embodiments, other methods to yield beer with supersaturated $CO_2$ in the saturation tank are utilized instead of relying on a gas headspace in the saturation tank.

One example of a method for adding liquid with supersaturated $CO_2$ to the carbonation tank is to pass the beer through a downbubble contactor where the beer is pumped vertically down under pressure and $CO_2$ gas is injected into the downward flowing beer. The velocity of the downward flowing beer is controlled to be the same as the rising velocity of the $CO_2$ gas bubbles such that the bubbles remain at the same location in the flowing beer until they dissolve. The beer flowing downward then passes through a saturation tank 14 containing a gas headspace 16 to remove any remaining bubbles and the bubble free beer is then transferred into the carbonation tank 10. The pressure in the downward flowing beer and $CO_2$ gas are controlled to be greater than atmospheric to produce beer supersaturated with dissolved $CO_2$ gas 18. Another method for dissolving $CO_2$ gas into a beer such that a supersaturated beer stream can be added to the carbonation tank is to use a Venturi-type injector to create a negative pressure within the flowing beer to draw in $CO_2$ gas from the source and create bubbles. Pressurized $CO_2$ gas can also be injected into the flowing beer within a pipe. The gas/beer mixture is then circulated within a pipe to allow much of the gas to dissolve over time and at controlled pressure to create beer supersaturated with dissolved $CO_2$ gas. The $CO_2$ gas/beer mixture can be transported into a saturation tank 14 to allow any remaining undissolved gas to exit the solution and become part of a gas headspace 16 above the supersaturated beer 18. The lower portion of the pressurized tank will then contain beer with no gas bubbles and can be transferred into the carbonation tank 10. Beer supersaturated with dissolved $CO_2$ gas can also be created by bubbling the $CO_2$ gas into the beer under pressure allowing the beer to become supersaturated with dissolved $CO_2$ gas and then transferring the supersaturated beer into the carbonation tank.

Once the supersaturated beer 18 with insignificant bubbles is created, it is then injected back into the carbonation tank 10 in a manner such that the supersaturated beer stream will mix with the subsaturated beer in the carbonation tank 10 and prevent off gassing of the $CO_2$. The system 20 continually circulates beer into and out of the carbonation tank 10 at the same rate. As predissolved $CO_2$ in beer is added to the carbonation tank 10, no undissolved gas is present in the carbonation tank 10. Since this carbonation method does not rely on bubbles to dissolve gas into the beer, there is no requirement for a gas headspace above the beer in the carbonation tank, which prevents the introduction of oxygen into the carbonation tank. Since there is no undissolved gas being added to the tank using this system 20, the pressure within the carbonation tank 10 will not increase during treatment because no volume is added as the incompressible liquid entering the tank is at the same rate as is being removed. The $CO_2$ will remain dissolved in the beer until the beer becomes saturated with $CO_2$ at the pressure in the carbonation tank 10 (atmospheric pressure 0 gauge). Once the beer is saturated, as more dissolved $CO_2$ is added to the beer, the beer can no longer hold the gas being added and will create an increase in pressure inside the carbonation tank 10 as the beer begins to off gas $CO_2$. As the pressure inside the carbonation tank 10 increases, the pressure of the beer increases and it is able to hold more $CO_2$ gas. Therefore, the resulting pressure inside the carbonation tank 10 corresponds to the concentration of dissolved $CO_2$ in the beer, and corresponds to the saturation tables for beer and equation (1) developed in this invention. This phenomenon allows for a key step in the present method.

Once the beer in the carbonation tank 10 reaches the preset pressure in the carbonation tank, the $CO_2$ gas is dissolved in the beer to the vol/vol concentration desired as established in the initial set point. Once this pressure is reached, a pressure sensor 22 tied to a valve 24 shuts-off the flow of supersaturated beer into the carbonation tank and closes all inlets and outlets as the beer has reached the desired $CO_2$ concentration. The pressure sensor 22 is also in communication with the pump 12 through, for example, a signal wire 38. The carbonated beer 26 is now held in the sealed carbonation tank 10 and will maintain the dissolved $CO_2$ concentration as long as beer temperature is maintained. The carbonated beer 26 may be removed from the carbonation tank 10 and the present system 20 through outlet 42. Beer temperature in the carbonation tank 10 can be controlled using circulating coolant surrounding the tank as is typical in beverage processing tanks. The beer can be held at this condition for an extended period of time (provided the temperature does not increase) as may be required before further processing occurs because of timing, or to allow further development of carbonation to complete steady-state conditions, or to allow for development of flavor chemistry characteristics. Once the pressure set point is reached, the operator is alerted for further manual processing. A pressure relief valve set to the desired set point as previously established is preferably installed in the carbonation tank 10 to allow some $CO_2$ gas to escape to ensure any existing oxygen in the beer is driven out of solution or to prevent overpressurization of the carbonation tank and beer if there is a lag between the pressure indicated in the carbonation tank and steady-state tank pressure that may be greater as $CO_2$ gas continues to escape solution after liquid flow into the carbonation tank ceases. This lag time may be caused when the flow rate of supersaturated beer 18 into the carbonation tank 10 is relatively high compared to the volume of the carbonation tank such that the total amount of $CO_2$ in the carbonation tank is more than that required to saturate the beer at the desired pressure set point. The operation may also be automatically controlled by PLC to move the beer from the carbonation tank onto the next process stage.

The equation to relate the desired final steady-state carbonation level in volume $CO_2$ to volume beer is:

$$P = (C*0.0013493*T^2 + C*0.094214*T + C*4.81904) - 14.7, \quad (1)$$

where P is pressure of beer in the carbonation tank when saturated with carbon dioxide at desired vol/vol in pounds per square inch gauge, C is desired concentration of carbon dioxide in volume $CO_2$ per volume beer, and T is temperature of beer in carbonation tank degrees F. This equation accurately predicts data from "Methods of Analysis" American Society of Brewing Chemists. 5th Edition, 1949 and can be programmed into a typical PLC.

Figure 1:
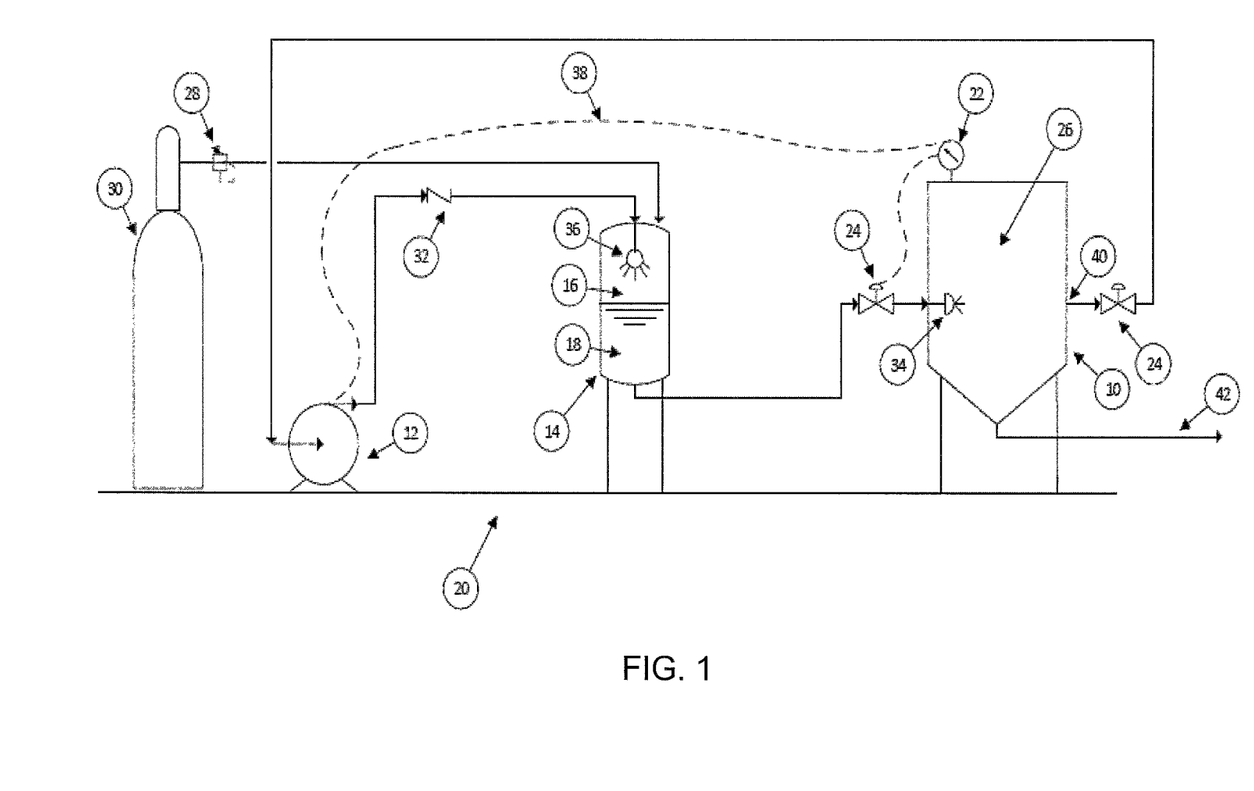
FIG. 1 is a schematic illustration of the apparatus of the present invention.

One preferred embodiment of the present invention is illustrated in FIG. 1. Beer is drawn from the carbonation tank 10 (i.e. a brite tank) into a pump 12. The pump 12 pressurizes the beer, passes the beer through a pipe, and injects it into a saturation tank 14. The saturation tank 14 is maintained at a controlled pressure via a pressure regulator 28 on the outlet of the gas source 30. A check valve 32 prevents contents of the saturation tank from flowing backwards into the pump 12 when the pump 12 is turned off or fails. Gas flows from the source 30, typically a dewar or gas cylinder, and passes through a pressure regulator 28 that controls the $CO_2$ gas pressure to the desired set point of the saturation tank 14. The source 30 for the $CO_2$ gas can also be captured from the fermentation (brewing) process off-gas, where the gas is cleaned and either stored in liquid form through a cryogenic process or compressed gas form or used directly from the fermentation process into the carbonation process.

The pressure controlled gas then passes into the gas headspace 16 of the saturation tank 14. Liquid beer is injected through nozzle 36 into the saturation tank 14 in such a manner as to cause the beer to become nearly saturated with $CO_2$ gas in equilibrium with the gas pressure in the saturation tank. The pressure in the saturation tank is typically elevated above pressure in the carbonation tank 10, thereby creating beer that is supersaturated with gas at the pressure in the carbonation tank. The saturation tank is designed such that the supersaturated beer exiting the tank will not contain significant gas bubbles and will be in a near pure liquid state.

The supersaturated liquid beer 18 exits the saturation tank 14, passes through a pipe, and is injected into the carbonation tank through a sized orifice 34 that allows the proper back pressure of the saturation tank 14 to be maintained throughout the liquid conduit carrying the beer from the saturation tank 14 to the carbonation tank 18. This will allow no significant pressure loss as the beer is transferred thereby preventing any gas from exiting solution prior to passing through the sized orifice. The supersaturated beer 18 passes through the sized orifice and into the larger volume of beer in the carbonation tank 10 being carbonated. Since the beer entering the carbonation tank 10 is supersaturated with gas, the injection pattern is designed such that the liquid supersaturated beer will distribute throughout the beer at subsaturated conditions in the carbonation tank prior to any gas having the required time to nucleate and exit solution as bubbles. The pressure in the carbonation tank 10 is initially at or very near atmospheric pressure. The pressure inside the carbonation tank 10 is maintained at initial conditions near atmospheric as the rate of liquid beer removed from the carbonation tank 10 by the pump 12 is the same rate as the beer being added to the carbonation tank 10 from the saturation tank 14, and $CO_2$ gas added to the beer remains in dissolved form as the beer in the carbonation tank is not saturated and is able to hold the dissolved gas. The dissolved gas does not add volume to the liquid beer and since the volume flow rate of beer entering the carbonation tank is the same as the volume flow rate of beer exiting the tank, the volume of the contents of the carbonation tank remains constant thereby allowing the pressure to remain constant inside the carbonation tank. However, as the amount of dissolved gas in the beer within the carbonation tank increases with time as dissolved gas is added, the amount of dissolved gas contained within the beer will eventually exceed saturation conditions (as quantified by equation 1) and the liquid beer in the carbonation tank will no longer be able to contain the dissolved $CO_2$ being added. Once the amount of $CO_2$ gas added to the beer exceeds saturation, then gas will escape solution from the beer in the carbonation tank. This escaped gas will add to the volume of the carbonation tank and will therefore increase the pressure in the rigid-walled carbonation tank. As the pressure of the beer in the carbonation tank increases, the beer is able to increase the amount of $CO_2$ it can hold because an increase in pressure concentrates the $CO_2$ gas and allows more to dissolve into the beer, which results in an increase in the vol $CO_2$/vol beer. Therefore, once the pressure within the carbonation tank exceeds atmospheric pressure, the beer is saturated with $CO_2$ and the pressure measured within the carbonation tank directly indicates the vol $CO_2$/vol beer as quantified by equation 1. A pressure sensor 22 will monitor the pressure in the carbonation tank and when the appropriate pressure is reached indicated by equation (1), the pressure sensor will signal a controller to shut-off power to the pump 12, and close the solenoid valves 24 feeding liquid to the carbonation tank and removing liquid from the carbonation tank. This operation thereby automatically carbonates the beer to the desired level without requiring the operator to monitor the process.

By adding supersatured beer 18 to the carbonation tank 10 rather than bubbles, the speed of carbonation can be increased dramatically. Since the gas is not bubbled anywhere in the process, no undissolved gas exits the carbonation tank and is wasted, thus greatly reducing the input costs, and the gas lost to the atmosphere is eliminated, thereby reducing the carbon footprint of the process and reducing greenhouse gas emissions.

Example

A prototype system was constructed and tested using a 190 liter volume plastic barrel to represent the brite (carbonation) tank 10. A mathematical model was constructed to predict the pressure in the brite tank at any time during the process based on equation 1 for solubility of $CO_2$ in water or beer along with mass balance of the gas and liquid entering and exiting the brite tank. The concentration of dissolved $CO_2$ in the beer exiting the saturation tank was determined using equation 1 for solubility of $CO_2$ in the liquid at saturation at known temperature and pressure and then fitting the observed data by adjusting the percent saturation attained by mixing in the saturation tank. This dissolved gas concentration along with the known liquid flow rate allowed a mass balance of gas entering the carbonation tank to be known. The volume of liquid in the carbonation tank remains constant, so the concentration of dissolved gas in the liquid in the carbonation tank can be calculated by adding the amount of incoming gas from the saturation tank to the volume in the carbonation tank while simultaneously subtracting the amount of gas exiting the carbonation tank assuming the tank was well mixed. Solving these equations over time allow the dissolved concentration of $CO_2$ in the liquid to be calculated at any time. Knowing the dissolved $CO_2$ concentration at any time along with equation 1 allows calculation of carbonation tank pressure or $CO_2$ concentration in units of vol/vol to be determined at any time. The model was compared to data collected for brite tank pressure measured over time. Brite tank expansion was taken into account by measuring the change in volume of the tank with increased pressure in separate experiments. Gas leaks could not be prevented with the prototype equipment, so leak rates were measured in separate experiments and included in the mathematical model. Using industry standard equipment, leaks can be prevented easily during commercial operation. The prototype tests were conducted using water as the beverage and both oxygen (one test) and carbon dioxide (five tests) as the gas to be dissolved into the beverage. Different gases were used because of different Henry's Law solubility behavior between oxygen and carbon dioxide. Carbon dioxide is far more soluble in water than oxygen. Testing these two gases provided a broad range of operating conditions to test the operation of the prototype and the accuracy of the mathematical model. This broad range resulted in a more robust proof of concept test.

Once the tests using water were successfully completed, a test using $CO_2$ and beer from a fermentation tank was conducted and the final pressure from the brite tank entered into the prediction equation for vol/vol of carbon dioxide in beer and this value was compared to that actually measured using the standard equipment from the brewery. All tests were successful and reasonably well predicted using the developed mathematical model. Since the model was based on mathematical relationships describing the proposed physics of the operation, the results indicate that the proposed function of the prototype measures as expected. The model was then used to estimate the performance of a scaled up prototype including economics. Further testing using a larger scale stainless steel brite tank (475 liters) with capabilities to monitor beverage temperature, pressure, and vol/vol carbonation levels was also utilized. Tests were conducted using water as the beverage and $CO_2$ as the gas to be dissolved. An industry standard Zahm and Nagel $CO_2$ volume meter was used to measure vol/vol for comparison to brite tank pressure readings. Three tests were conducted using water and $CO_2$. The data was similar to that expected from the mathematical model scaleup and showed the same operational behavior as expected and as shown in the smaller scale testing. Results of the vol/vol measurements using the Zahm and Nagel $CO_2$ volume meter were similar to those determined using the pressure indicator on the brite tank and the equation developed as part of this invention. However, the vol/vol results from the brite tank pressure gage and equation seemed to be far more consistent than the Zahm and Nagel readings. This may indicate another advantage of this technology: vol/vol measurements are more consistent leading to tighter control over final vol/vol conditions of the beer prior to packaging. This improvement could result in further savings in $CO_2$ use as well as better quality control over the final product reaching the consumer.

Test 1—Dissolving Oxygen in Water. Tests were performed with the following operational data:

| | |
|---|---|
| Water Temperature (deg C) | 23.1 |
| Water Flow Rate (gallons per minute) | 1.27 |
| Nozzle pressure drop (psig) | 33.25 |
| Saturator Pressure (psig) | 49.3 |
| Percent Saturation in Saturator (%) | 38.6 |

Figure 2:
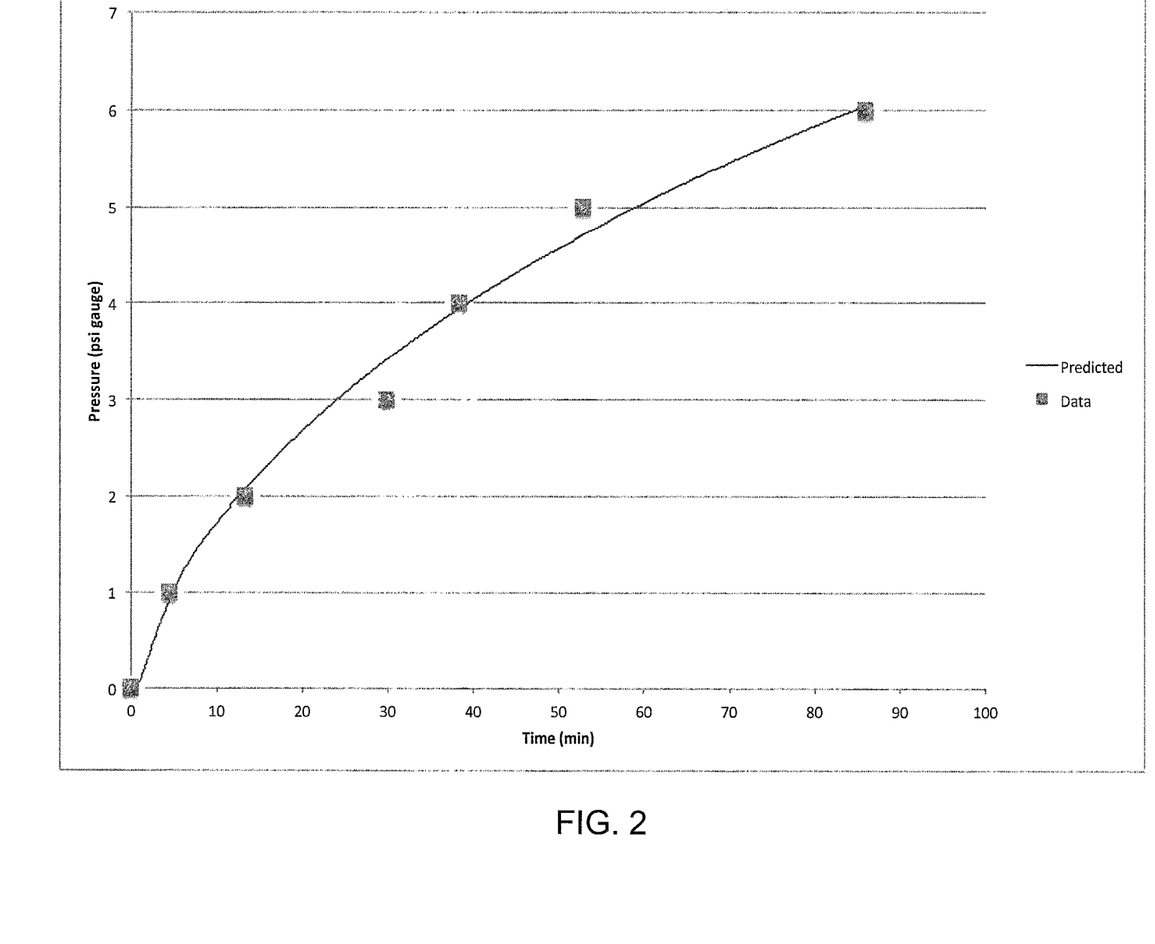
FIG. 2 is a graph showing brite tank pressure versus time for dissolving oxygen in water as predicted by a mathematical model and as calculated during testing of a prototype system of the present invention.

Water temperature, flow rate, nozzle pressure drop, and saturator pressure were directly measured. Percent saturation of water with dissolved oxygen in saturation tank was fitted to the data based on a previously developed equation for estimating percent saturation from nozzle type and pressure drop. The results are shown in FIG. 2.

Oxygen gas is relatively insoluble in water meaning that the water does not possess much "room" to hold oxygen molecules. The water contained in the brite tank prior to initiating the invention was nearly saturated with dissolved oxygen. Therefore, once the invention was activated, the water in the brite tank quickly become saturated and began to exert a vapor pressure of oxygen gas within the brite tank. This is indicated by the nearly immediate increase in measured pressure of the brite tank. The rate of increase in pressure is non linear because of the expansion of the plastic tank and oxygen gas leaks. The mathematical model was able to capture this behavior and accurately predict the increase in pressure over time. The relative insolubility of oxygen in water is also shown in the relatively long period of time required to reach 6 psi tank pressure of 90 minutes.

Regarding the percent saturation number fitted by the model, the percent saturation of oxygen gas in water in the saturation tank in the prototype (38%) was consistent with prior measurements from previous work. This number indicates that the actual concentration of dissolved oxygen exiting the saturation tank from the invention and entering the brite tank is 38% of the solubility predicted by Henry's Law. The Henry's Law solubility is the steady-state concentration of oxygen dissolved in water at a known water temperature and gas pressure. The magnitude of this value will depend on how quickly the water spray absorbs oxygen gas in the saturation tank headspace. This depends on the size of the spray particles, retention time of spray in the headspace, and mixing of gas bubbles with water within the saturation tank. This depends on the type of spray nozzle used and pressure drop across the nozzle as well as volume and shape of the saturation tank. The relative level of water and gas in the saturation tank also affect this value. These parameters are all design decisions that can be used to control the percent saturation exiting the tank. A general rule is that the greater the percent saturation, the higher the cost of the unit. Therefore, it is not necessarily optimal regarding overall cost to produce a high percent saturation. The spray nozzle used in this prototype resulted in lower than typical percent saturation values.

Test 2—Dissolving Carbon Dioxide in Water: Tests were performed with the following operational data:

| | |
|---|---|
| Water Temperature (deg C) | 23.5 |
| Water Flow Rate (gallons per minute) | 1.79 |
| Nozzle pressure drop (psig) | 17.6 |
| Saturator Pressure (psig) | 70.5 |
| Percent Saturation in Saturator (%) | 53.4 |

Figure 3:
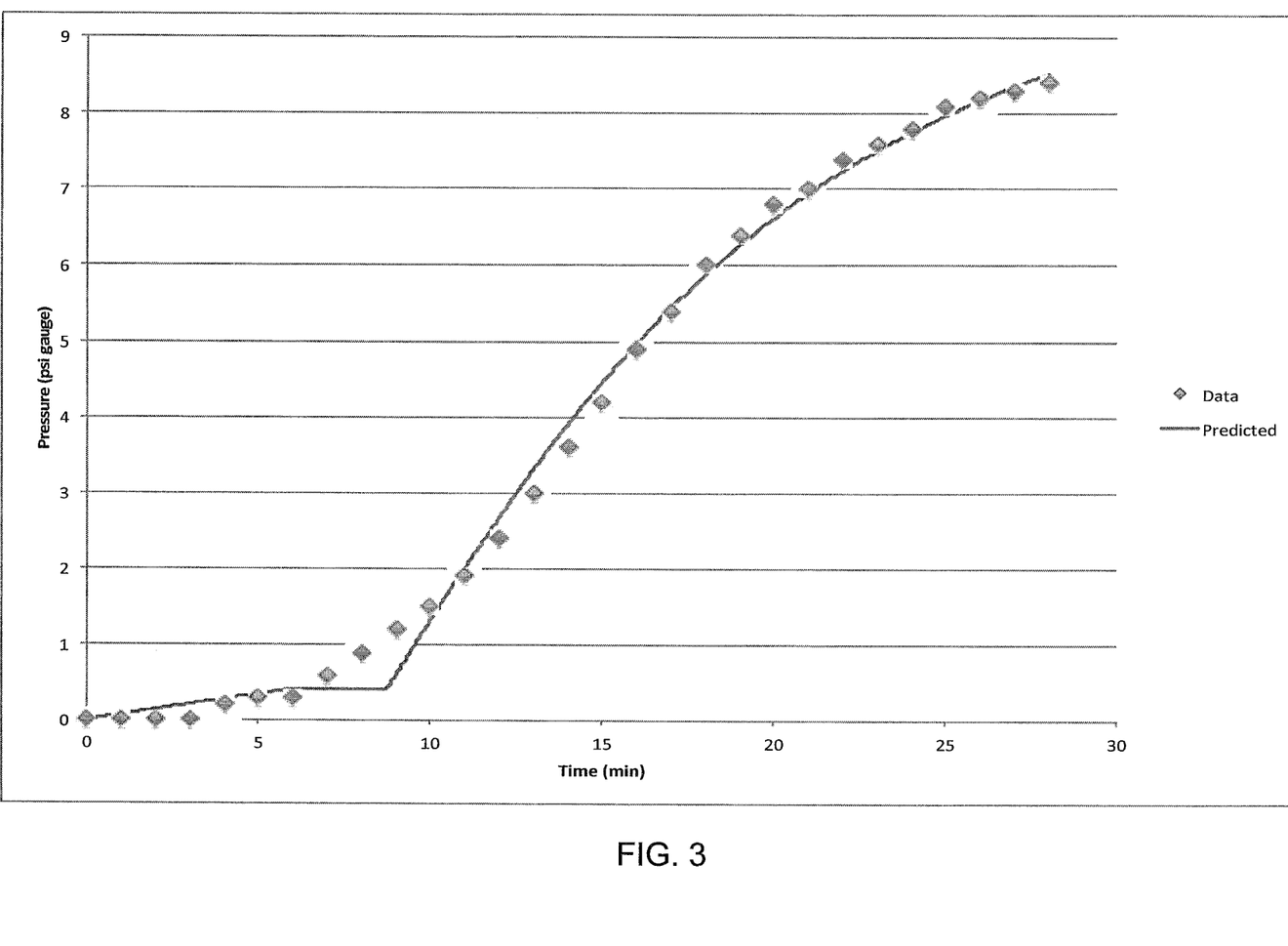
FIG. 3 is a graph showing brite tank pressure versus time for dissolving carbon dioxide in water as predicted by a mathematical model and as calculated during testing of a prototype system of the present invention.

The results are shown in FIG. 3. Test 2 differed from Test 1 because carbon dioxide gas was used rather than oxygen. Carbon dioxide gas is far more soluble in water than oxygen gas in water. This is indicated by the lag time required for the pressure of the brite tank to begin to increase. The initial concentration of carbon dioxide gas in the water in the brite tank was nearly zero. The data in FIG. 3 indicates that 5 to 10 minutes were required to saturate the water with carbon dioxide gas before the water began to exert a pressure from carbon dioxide. Once the water was saturated, the brite tank pressure began to consistently increase with a non-linear shape because of leaks and tank expansion. The mathematical model was able to accurately predict the observed behavior. The brite tank reached peak pressure much more quickly in Test 2 than Test 1 for oxygen because of insolubility of oxygen in water as well as an increase in water flow rate and saturation tank pressure.

The prototype system was improved between Tests 1 and 2 by changing pumps and producing a greater water flow rate. The saturation tank of the prototype was also improved to allow greater pressure and increasing the concentration of dissolved gas in the water exiting the saturation chamber and entering the brite tank. Leaks were also repaired, but not completely stopped.

This data indicates that some of the potential problems of this invention are not present. If the carbon dioxide gas was not dissolving completely into the water, then gas bubbles would be added to the water in the brite tank thereby adding volume and increasing pressure immediately. The lag in pressure indicates that the proposed behavior of the invention appears to be correct. Once the prototype operation was stopped, the increase in observed pressure in the brite tank also stopped indicating that there was not a lag between the vol/vol of the gas and the pressure indicated on the brite tank.

Figure 4:
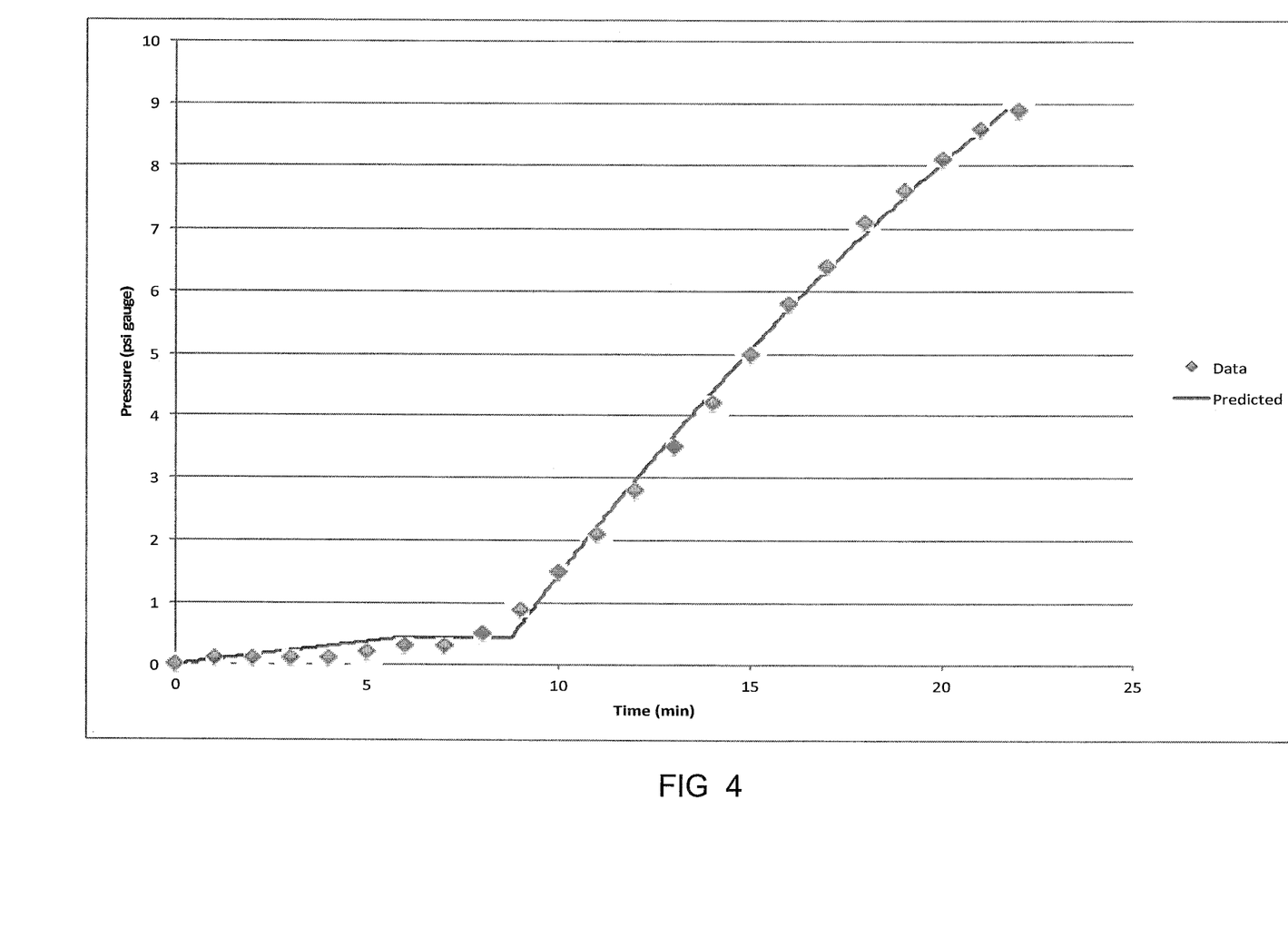
FIG. 4 is a graph showing brite tank pressure versus time for dissolving carbon dioxide in water as predicted by a mathematical model and as calculated during testing of a prototype system of the present invention.

Test 3, 4, 5, and 6—Dissolving Carbon Dioxide Gas into Water: The results from these tests were very similar to those shown in FIG. 3. The brite tank pressure did not increase until a 5 to 10 minute lag time allowed the water to become saturated at 0 (atmospheric) pressure and then the pressure increased steadily. The slope of the line indicating pressure became more linear as leaks were repaired. FIG. 4 shows the results from Test 6.

Figure 5:
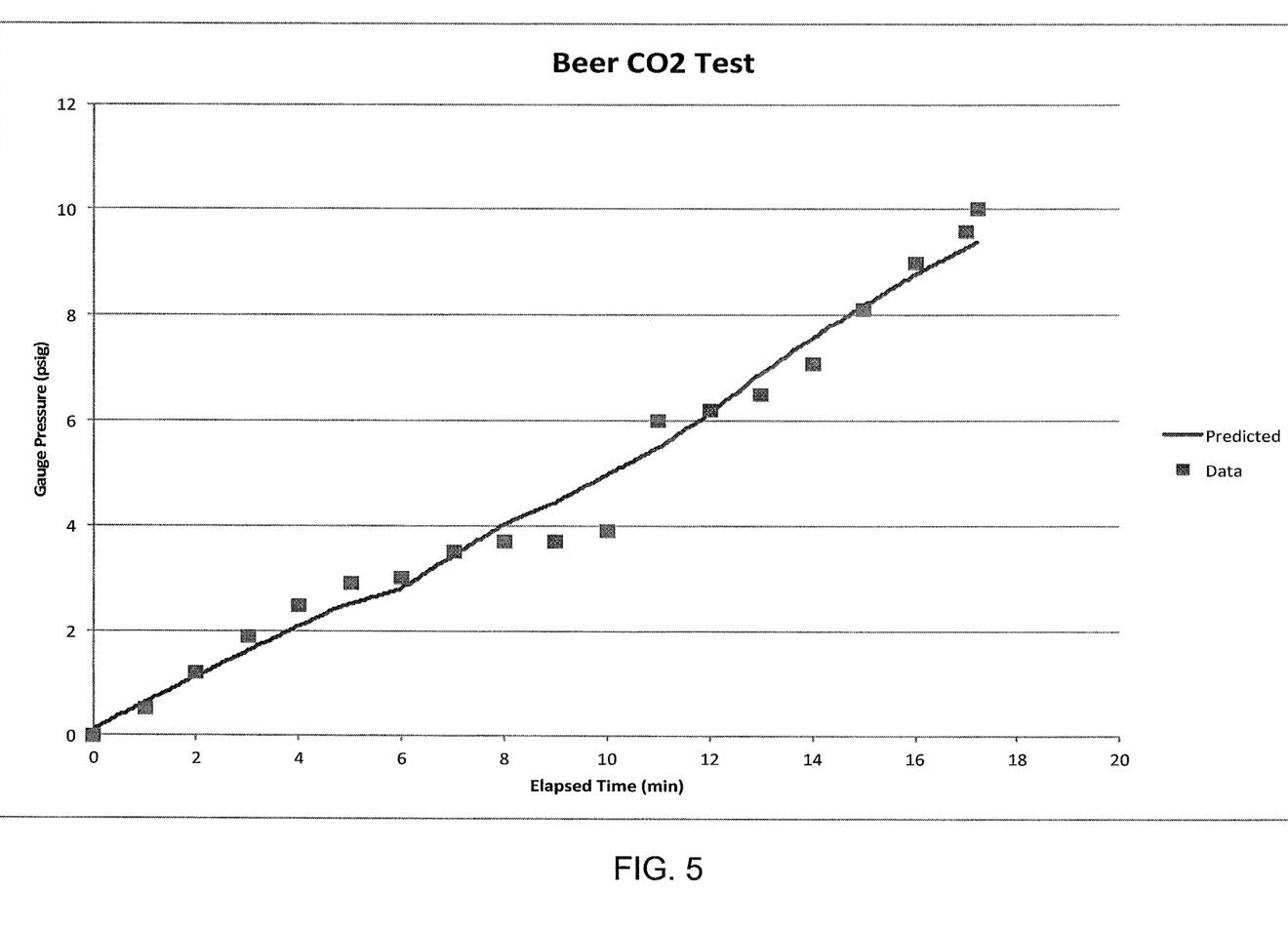
FIG. 5 is a graph showing brite tank pressure versus time for dissolving carbon dioxide in beer as predicted by a mathematical model and as calculated during testing of a prototype system of the present invention.

Test 7—Dissolving Carbon Dioxide Gas into Beer: Through water testing, the prototype construction was adjusted and problems repaired. Test 7 involved replacing water with beer. Core Brewery in Springdale, Ark. donated 200 liters of beer from a fermentation tank for this testing. The beer was transported from Core to the lab where the prototype was moved into a refrigerated cold room maintained at approximately 8 degrees C. The brite tank was filled with beer for testing. Data was collected for brite tank pressure versus time, as shown in FIG. 5. Once testing was complete, a sample of carbonated beer was collected and transported back to Core for testing with the Zahm and Nagle $CO_2$ meter.

There was not a lag time between the start of carbonation and an increase in brite tank pressure. This was because the beer used for the test was removed from the fermentation process where the beer is saturated with $CO_2$ at near atmospheric pressure. The model was able to predict the observed data well indicating that the processes that were expected to occur appeared to actually occur. The beer sample taken to Core for testing was collected at a pressure of 7.7 psig at a temperature of 7.8 degrees C. The equation developed for this invention indicated the vol/vol measurement should have been 1.87 vol CO2/vol beer. The Zahm and Nagel $CO_2$ meter gave a reading of 1.91 vol CO2/vol beer. At the lab scale, the carbonation time achieved was 18 minutes compared to a full-scale typical time of 8 to 10 hours. Overall, the invention appeared to operate as anticipated and provide acceptable beer carbonation.

Figure 6:
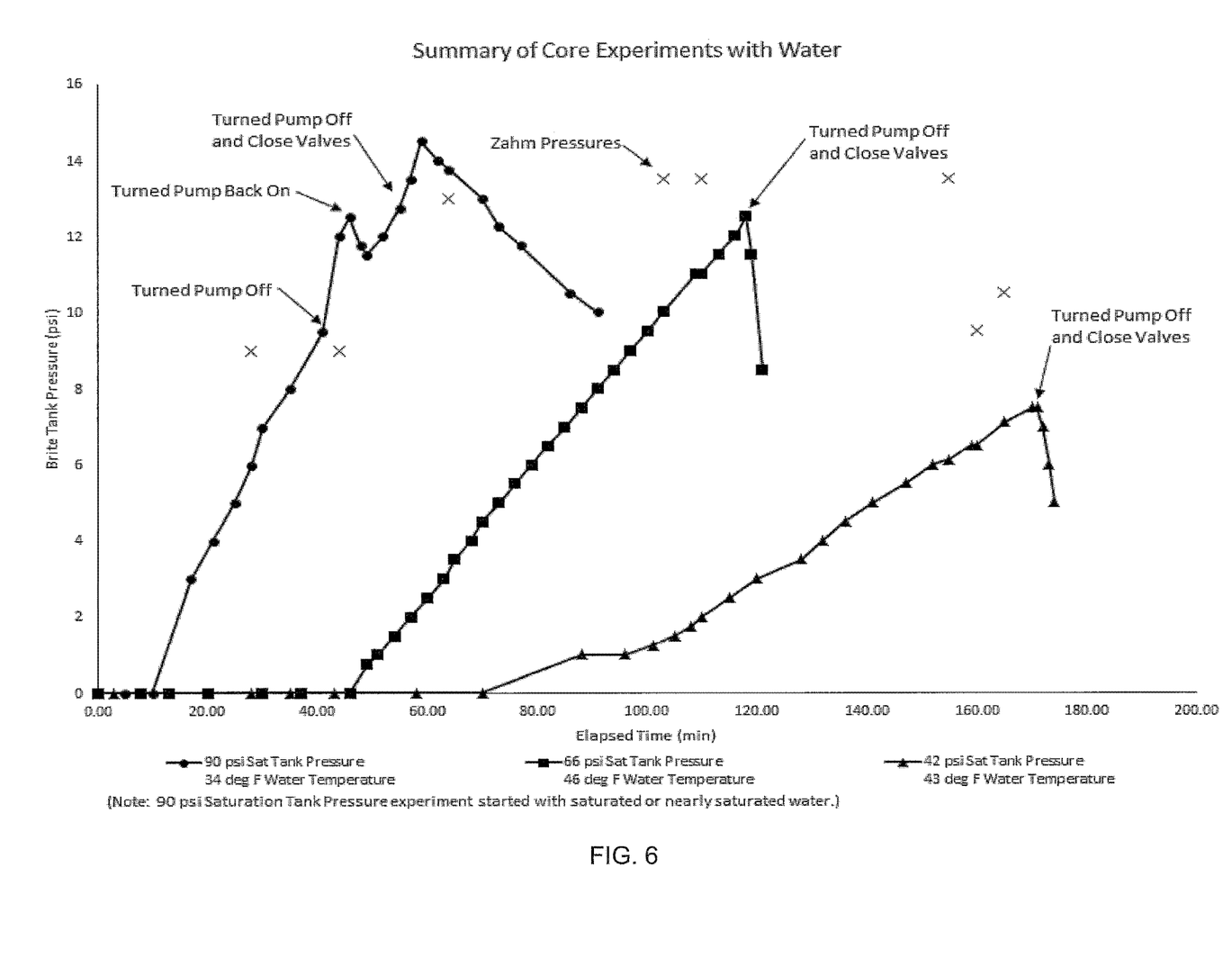
FIG. 6 is a graph showing measured brite tank pressure versus time for dissolving carbon dioxide in water at different saturation tank pressures and water temperatures during testing of a prototype system of the present invention.

Tests 8, 9, and 10—Dissolving Carbon Dioxide in Water at Core Brewery: The prototype saturation tank used for the tests described above was connected to a stainless steel brite tank at Core Brewery in Springdale, Ark. This brite tank was about a 2.5 times scale-up from the barrel used in Tests 1-7 and had the added advantage of not expanding significantly under pressure and ability to use a circulating glycol solution around the tank to cool the beverage and maintain a constant temperature. The tests were conducted using water cooled in the tank. Gas leaks were discovered resulting in the inability of the brite tank to maintain pressure after the prototype had completed carbonation and the brite tank was sealed. The leaks are currently being repaired so data can be generated for comparison to the mathematical model. However, testing with water showed similar results to the prior tests regarding the proposed behavior of the prototype and brite tank system. FIG. 6 shows the brite tank pressure versus time for three tests conducted at three different prototype saturation tank pressures and water temperatures. All tests show the same behavior that the water appears to require a lag time to become saturated with carbon dioxide and then the tank pressure begins to increase. The test at 90 psi saturation tank pressure was started after the water had been carbonated and then depressurized, so the initial dissolved carbon concentration was near saturated resulting in minimal lag time before brite tank pressure began to increase. The mathematical model predicts a slightly faster carbonation time than that observed in FIG. 6, but the model does not take the significant gas leaks into account. The gas leaks can be observed in FIG. 6 at the end of each test as the pressure in the brite tank begins to quickly decrease. Leaking carbon dioxide during testing results in an under reading of pressure observed, so the model's prediction of faster carbonation than observed is not surprising. However, the behavior of the data is consistent with prior observations showing an initial lag in pressure increase and then a linear increase in pressure that is proposed to correspond to an increase in vol/vol measurement of carbonation in water.

Figure 7:
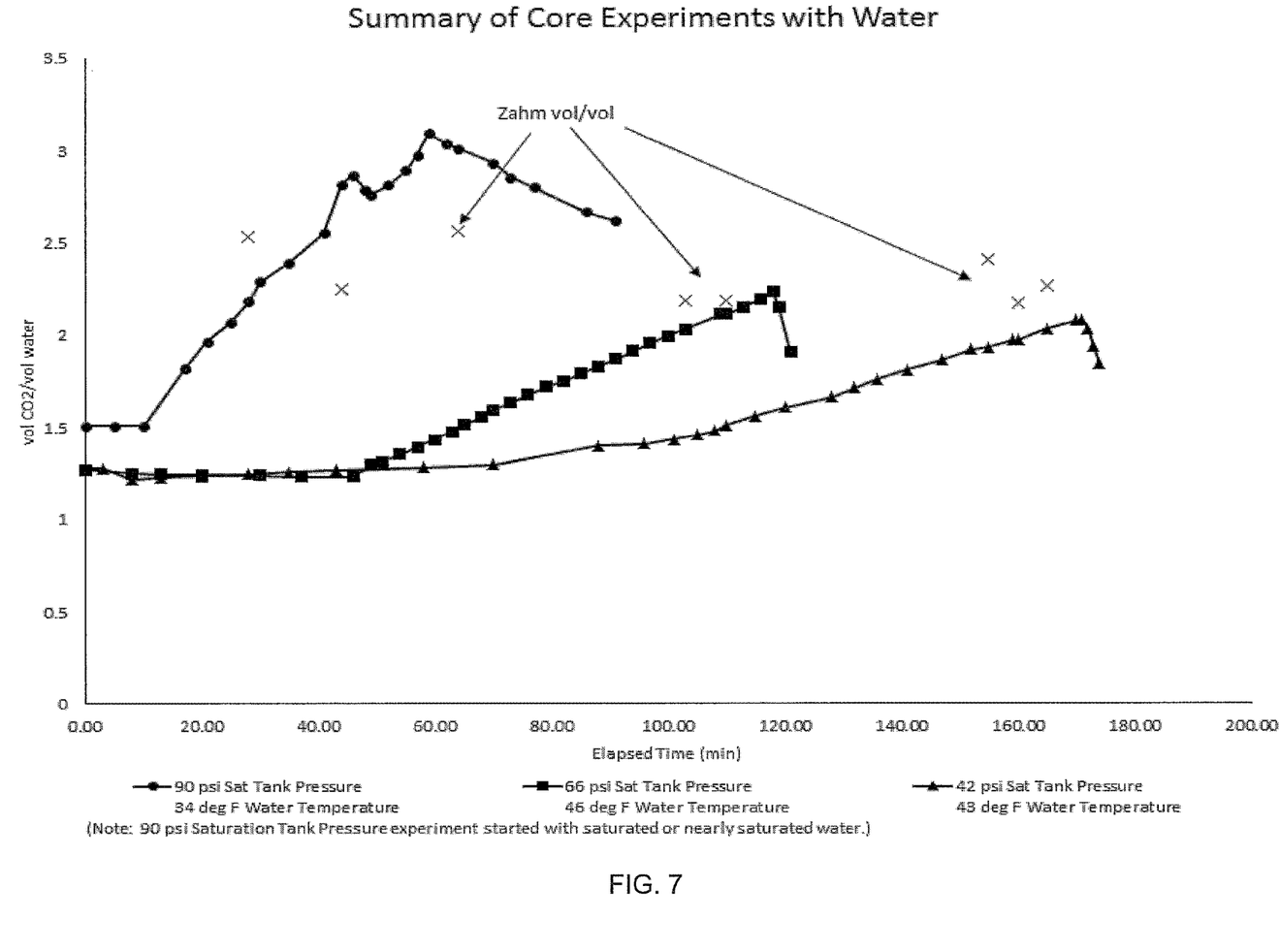
FIG. 7 is a graph showing measured dissolved carbon dioxide in water in units of vol/vol versus time at different saturation tank pressures and water temperatures during testing of a prototype system of the present invention.

FIG. 7 shows the pressure versus time data in the brite tank for tests 8, 9, and 10 converted to vol $CO_2$/vol water with the added data of vol $CO_2$/vol water using the Zahm and Nagel $CO_2$ meter. The data in FIG. 7 shows an increase in vol/vol reading, but it should be understood that a reading of 0 psi on the brite tank could indicate that the concentration of dissolved $CO_2$ in the water is anywhere between 0 and saturated at the water temperature. Once the water becomes saturated with dissolved carbon dioxide, the pressure will increase on the brite tank and the water in the tank is saturated with carbon dioxide, so the pressure reading is a direct indication of vol/vol. When the water is below saturation conditions for dissolved $CO_2$, the brite tank pressure reading will not correspond to vol/vol. The predicted vol/vol readings from brite tank pressure for the 90 psi test both under and over predicted the Zahm and Nagel readings. However, it appears as if the Zahm and Nagel readings were not consistent over time and may indicate measurement error. The Zahm and Nagel operator from Core indicated that the meter often gives variable readings on beer collected from the brite tank because of highly variable conditions of temperature of the beer and the meter. For the 66 psi test, the predicted vol/vol readings were only slightly lower than the measured vol/vol readings, indicating that if there is a difference, the actual carbonation level of the water is higher than predicted by the brite tank pressure reading. The 42 psi test also indicated that the Zahm and Nagel readings were greater than the predicted vol/vol from brite tank pressure. Overall, the vol/vol readings based on brite tank pressure appeared to be more consistent than the Zahm and Nagel meter readings. This may indicate another advantage of the proposed invention is that it provides a more consistent indication of actual vol/vol state of the beverage at any time, thus allowing tighter control over gas use and process output quality.

Using the Mathematical Model: The model developed from lab-scale data can be scaled to commercial operational size. It can project capital and operating costs of a larger scale system to carbonate beverages in much larger brite tanks. Rough analysis indicates that 50% operational cost savings can be realized by using less carbon dioxide. However, the majority of cost savings may be realized because of reduced operator time required to monitor the carbonation process and the improved quality control that can be gained by a more consistent and predictable carbonation process.

Summary and Conclusions: The data collected from both small and medium scale tests with oxygen dissolved in water, $CO_2$ dissolved in water and $CO_2$ dissolved in beer all indicate that the invention works as proposed and is able to carbonate beverages without wasting $CO_2$ gas. The data indicates the operating parameters of the invention are able to consistently control the rate and final carbonation level of the beverage. The mathematical model based on the proposed physics of the invention appears to consistently and accurately describe the process indicating that the proposed mechanisms of operation are consistent with the results.

As mentioned above, the present apparatus and method can also be used for nitrogenating a beverage or in any other process for adding a dissolved gas to a beverage. This alternative embodiment may be described with reference to FIG. 8.

Figure 8:
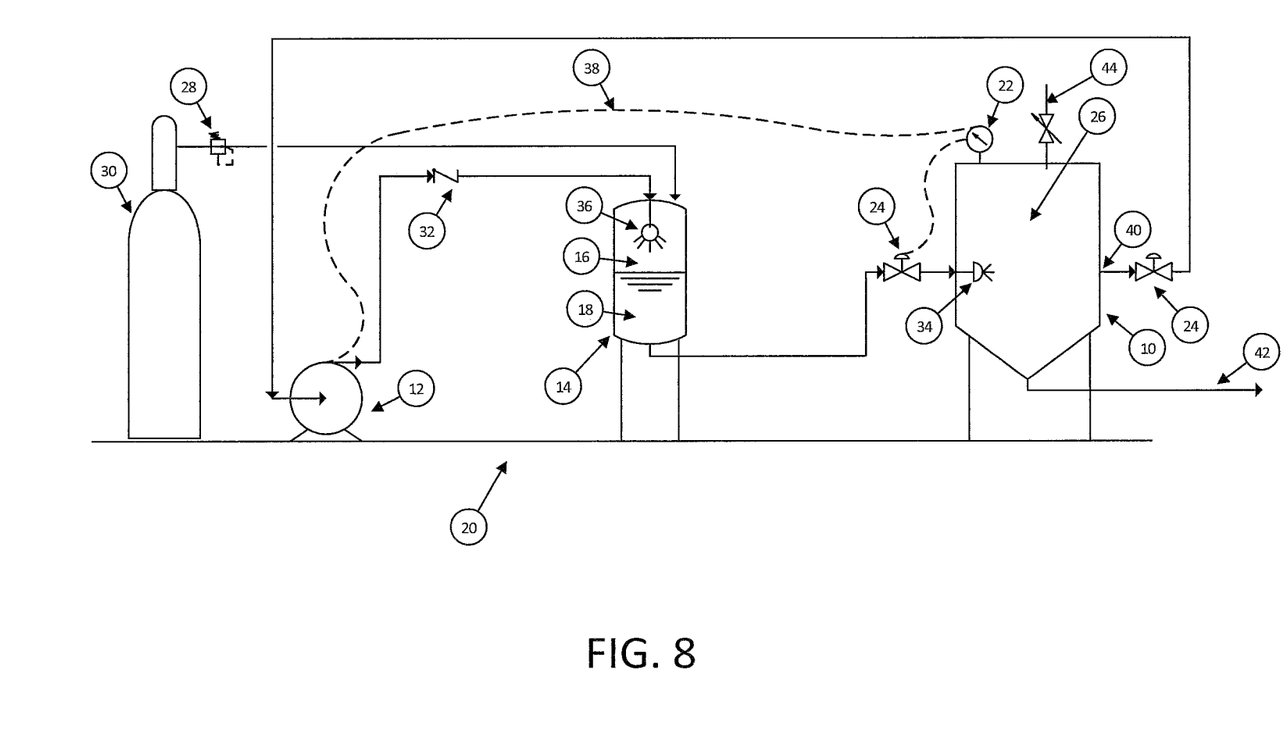
FIG. 8 is a schematic illustration of an alternative embodiment of the apparatus of the present invention.

Nitrogenation of a beverage is conducted using a slightly modified method as described above for carbonation. The gas flow rate of nitrogen gas into the saturation tank 14 will typically be less than that of carbon dioxide, which permits smaller pipe sizes to be used in the system. Also, since nitrogen gas is less soluble in beverages than carbon dioxide at the same saturation tank pressure, it may be advantageous for the operating pressure of the saturation tank 14 to be greater than that used with carbonation.

In contrast to Equation 1 above for carbonation, the equation that relates brite tank pressure and temperature to dissolved gas concentration in the beer is different for nitrogen than for carbon dioxide. The equation for nitrogen is:

$$P = \left[72.94 * \exp\left[-1300\left(\frac{1}{\left(\frac{T-32}{1.8}\right)+273} - \frac{1}{298}\right)\right] * C\right] * 14.7 - 14.7, \quad (2)$$

where P is pressure in pounds per square inch gauge, T is temperature °F., C is concentration volume of nitrogen per volume beer. This equation can be used to control the nitrogenation process by turning off the beer circulation when the appropriate pressure is reached indicating the desired concentration of dissolved nitrogen in beer has been reached.

With reference to FIG. 8 and as described in detail below, the system 20 of the present invention may be used to nitrogenate beer. Beer is drawn from the brite tank 10 into a pump 12. The pump 12 pressurizes the beer, passes the beer through a pipe, and injects it into a saturation tank 14. The saturation tank 14 is maintained at a controlled pressure via a pressure regulator 28 on the outlet of the gas source 30. A check valve 32 prevents contents of the saturation tank from flowing backwards into the pump 12 when the pump 12 is turned off or fails. Gas flows from the source 30, typically a nitrogen dewar or gas cylinder, and passes through a pressure regulator 28 that controls the nitrogen gas pressure to the desired set point of the saturation tank 14.

The pressure controlled gas then passes into the gas headspace 16 of the saturation tank 14. Liquid beer is injected through nozzle 36 into the saturation tank 14 in such a manner as to cause the beer to become nearly saturated with nitrogen gas in equilibrium with the gas pressure in the saturation tank. The pressure in the saturation tank 14 is typically elevated above pressure in the brite tank 10, thereby creating beer that is supersaturated with nitrogen gas at the pressure in the brite tank 10. The saturation tank 14 is designed such that the supersaturated beer exiting the tank will not contain significant gas bubbles and will be in a near pure liquid state.

The supersaturated liquid beer 18 exits the saturation tank 14, passes through a pipe, and is injected into the brite tank 10 through a sized orifice 34 that allows the proper back pressure of the saturation tank 14 to be maintained throughout the liquid conduit carrying the beer from the saturation tank 14 to the brite tank 10. This will allow no significant pressure loss as the beer is transferred thereby preventing any gas from exiting solution prior to passing through the sized orifice. The supersaturated beer 18 passes through the sized orifice and into the larger volume of beer in the brite tank 10 being nitrogenated. Since the beer entering the brite tank 10 is supersaturated with gas, the injection pattern is designed such that the liquid supersaturated beer will distribute throughout the beer at subsaturated conditions in the brite tank prior to any gas having the required time to nucleate and exit solution as bubbles. The pressure in the brite tank 10 is initially at or very near atmospheric pressure. The pressure inside the brite tank 10 is maintained at initial conditions near atmospheric as the rate of liquid beer removed from the brite tank 10 by the pump 12 is the same rate as the beer being added to the brite tank 10 from the saturation tank 14. Nitrogen gas added to the beer remains in dissolved form as the beer in the brite tank is not saturated and is able to hold the dissolved gas. The dissolved gas does not add volume to the liquid beer and since the volume flow rate of beer entering the brite tank is the same as the volume flow rate of beer exiting the tank, the volume of the contents of the brite tank remains constant thereby allowing the pressure to remain constant inside the brite tank. However, as the amount of dissolved gas in the beer within the brite tank increases with time as dissolved gas is added, the amount of dissolved gas contained within the beer will eventually exceed saturation conditions (as quantified by equation 2) and the liquid beer in the brite tank will no longer be able to contain the dissolved nitrogen being added. Once the amount of nitrogen gas added to the beer exceeds saturation, then gas will escape solution from the beer in the brite tank. This escaped gas will add to the volume of the brite tank and will therefore increase the pressure in the rigid-walled brite tank. As the pressure of the beer in the brite tank increases, the beer is able to increase the amount of nitrogen it can hold because an increase in pressure concentrates the nitrogen gas and allows more to dissolve into the beer, which results in an increase in the vol nitrogen/vol beer. Therefore, once the pressure within the brite tank exceeds atmospheric pressure, the beer is saturated with nitrogen and the pressure measured within the brite tank directly indicates the vol nitrogen/vol beer as quantified by equation 2. A pressure sensor 22 will monitor the pressure in the brite tank and when the appropriate pressure is reached indicated by equation (2), the pressure sensor will signal a controller to shut-off power to the pump 12, and close the solenoid valves 24 feeding liquid to the brite tank and removing liquid from the brite tank. This operation thereby automatically nitrogenates the beer to the desired level without requiring the operator to monitor the process.

The system of the present invention may also be used for blending custom ratios of gases. As previously described, current bubble methods for dissolving different gases into beer such as nitrogen and carbon dioxide require using a gas source containing a pre-measured mixture of the desired ratio of the gases. The dissolution process cannot be conducted sequentially because adding the second gas will strip out the first gas dissolved. For example, if a brewer wanted to create a beer with 1.2 vol carbon dioxide/vol beer and 0.016 vol nitrogen/vol beer, the brewer could not bubble the beer with pure carbon dioxide until the desired level is reached, then stop the bubbling process, change gas sources to nitrogen, and then bubble with nitrogen. Since nitrogen bubbles contain zero carbon dioxide, exposing the carbonated beer to nitrogen gas bubbles will cause the dissolved carbon dioxide in the beer to diffuse into the nitrogen bubbles and the carbon dioxide will be stripped out of the beer as the bubbles exit the beer and the brite tank. The stripping process would also remove dissolved nitrogen from the beer if nitrogenation was conducted first followed by carbonation. Therefore, the gas bubbles need to contain the proper ratio of nitrogen and carbon dioxide to result in the desired final ratio of dissolved nitrogen and carbon dioxide at equilibrium.

Using the system of the present invention, a brewer can first carbonate the beer with pure carbon dioxide to a desired concentration, then stop the process, change the gas source to pure nitrogen, and then nitrogenate the beer to the desired concentration. The carbon dioxide gas (first gas) dissolved in the beer contained in brite tank 10 and saturation tank 14 will remain dissolved because the system is sealed and none of the carbon dioxide gas can escape. Once nitrogenation begins and nitrogen gas is added to the gas headspace 16 in the saturation tank 14 the headspace will contain mostly nitrogen gas (second gas). As the carbonated beer passes into the headspace, some carbon dioxide will escape into the headspace. Once the partial pressure of carbon dioxide in the headspace comes to equilibrium with the dissolved carbon dioxide in the beer, carbon dioxide will no longer escape the beer. The nitrogen gas in the headspace 16 must exist at a partial pressure exceeding the partial pressure exerted by the carbon dioxide. The carbon dioxide pressure is substantially below that of the nitrogen gas in the saturation tank 14, so nitrogen gas will dissolve into the beer. By monitoring the pressure in the brite tank 10, the brewer will know when nitrogenation is complete by determining the required nitrogen pressure from equation 2 and adding this value to the carbon dioxide pressure created during carbonation as provided in equation 1. When the total brite tank 10 pressure reaches this value, the combined carbonation and nitrogenation processes are complete and the final beer contains any combination of dissolved gases optimized to meet the desired taste the brewer wishes to create. Importantly, the ratio of dissolved gases is not limited to those created by using commercially available gas mixtures. The sequential order of gases dissolved into the beer does not matter and can be done based on operational needs and gas availability. The use of other gases can also be used based on the above description.

The system of the present invention may also be used to remove dissolved gas from beer. A significant problem for brewers is dissolving too much gas into the beer. When beer is over-carbonated, the flavor is changed, the beer will foam too much and the pressure created in packages can be too great. Brewers wish to remove carbonation from beer if over-carbonated. However, this process is slow and difficult because carbon dioxide is highly soluble in beer. Typically to remove carbonation from beer, the brewer will release the pressure on the brite tank to atmospheric pressure, open a valve in the top headspace and allow the carbon dioxide to escape. This process is very slow and can cost the brewer significant operational time. The de-carbonation process can be sped up by agitating the beer, but this must be done carefully to avoid the creation of excess foam that can escape the brite tank and create an undesirable mess in addition to losing beer and stripping flavors.

This system 20 can degas beer very rapidly by operating according to FIG. 8, but rather than feeding gas to saturation tank 14, valve 28 is closed preventing gas flow. Saturation tank 14 is filled to the top with no gas headspace 16. Valve 44 at the top of brite tank 10 is opened slightly, which begins to allow gas to escape from the beer in brite tank 10 and reduce pressure in brite tank 10. As pump 12 operates and beer is circulated through the system 20 to spray out of nozzle 34 into the brite tank 10, the beer is agitated such that carbon dioxide in the beer will approach equilibrium with the lowered pressure in tank 10 resulting in lowering of the dissolved carbon dioxide in the beer. The flow rate of pump 12 can be controlled to provide sufficient agitation to the beer without over foaming. The rate that valve 44 is opened and pressure in brite tank 10 decreases can also be adjusted to control the rate gas exits solution from beer in brite tank 10. For example, if valve 44 is only opened slightly, the gas will escape slowly from tank 10 and the pressure will be reduced only slightly below the initial equilibrium value. Since the pressure reduction is small, the amount of gas exiting solution will be small and the resulting foam will also be small. If valve 44 is opened more, then the gas will escape more rapidly creating more foam. This control allows the operator to degas the beer as quickly as possible without causing excess foaming problems. Valve 44 at the top of brite tank 10 can be periodically closed so the pressure in tank 10 will increase to equilibrium with the beer and equation 1 can be used to guide the brewer to turn off the system when the proper carbonation level is obtained.

The present invention has been described with reference to certain preferred and alternative embodiments that are intended to be exemplary only and not limiting to the full scope of the present invention.

I claim:

1. A system for controlling a concentration of a gas dissolved in a beverage, comprising:
   a saturation tank, wherein said saturation tank is configured to contain a beverage supersaturated with said gas;
   a brite tank, wherein said saturation tank is configured to have a higher pressure than said brite tank, wherein a pressure sensor is in communication with said brite tank;
   a beverage supply system connected to said saturation tank and said brite tank, wherein said beverage supply system is configured to pass said beverage from said saturation tank to said brite tank and from said brite tank to said saturation tank, wherein said pressure sensor is in communication with a valve configured to control the passage of said beverage from said saturation tank to said brite tank; and
   a source of said gas in communication with said saturation tank.

2. The system of claim 1, wherein said saturation tank is configured to contain said gas in a head space above said beverage, wherein said saturation tank comprises an inlet connectable to said beverage supply system and configured to permit passage of said beverage into said head space so as to dissolve some of said gas contained in the head space in said beverage.

3. The system of claim 2, further comprising a gas supply system, wherein said gas supply system is configured to transport said gas from said source to said head space.

4. The system of claim 1, wherein said brite tank comprises a first outlet and a second outlet, wherein said first outlet is in communication with said saturation tank via said beverage supply system and said second outlet is configured to pass said beverage out of said system.

5. The system of claim 1, wherein said system is controlled by a programmable logic controller.

6. The system of claim 1, wherein said beverage supply system comprises a pump in communication with said saturation tank and said brite tank.

7. The system of claim 1, wherein said gas is carbon dioxide.

8. The system of claim 1, wherein said gas is nitrogen.

9. The system of claim 2, wherein said inlet is a nozzle.

10. The system of claim 1, wherein said beverage is beer.

11. A system for controlling a concentration of a gas dissolved in a beverage, comprising:
    a saturation tank, wherein said saturation tank is configured to contain a beverage supersaturated with said gas;

a brite tank, wherein said saturation tank is configured to have a higher pressure than said brite tank;

a beverage supply system connected to said saturation tank and said brite tank, wherein said beverage supply system is configured to pass said beverage from said saturation tank to said brite tank and from said brite tank to said saturation tank; and a source of said gas in communication with said saturation tank, wherein said saturation tank is configured to contain said gas in a head space above said beverage, wherein said saturation tank comprises an inlet connectable to said beverage supply system and configured to permit passage of said beverage into said head space so as to dissolve some of said gas contained in the head space in said beverage.

12. The system of claim 11, wherein a pressure sensor is in communication with said brite tank.

13. The system of claim 12, wherein said pressure sensor is in communication with a valve configured to control the passage of said beverage from said saturation tank to said brite tank.

14. The system of claim 11, further comprising a gas supply system, wherein said gas supply system is configured to transport said gas from said source to said head space.

15. A system for controlling a concentration of a gas dissolved in a beverage, comprising:

a saturation tank, wherein said saturation tank is configured to contain a beverage supersaturated with said gas;

a brite tank, wherein said saturation tank is configured to have a higher pressure than said brite tank;

a beverage supply system connected to said saturation tank and said brite tank, wherein said beverage supply system is configured to pass said beverage from said saturation tank to said brite tank and from said brite tank to said saturation tank, wherein said brite tank comprises a first outlet and a second outlet, wherein said first outlet is in communication with said saturation tank via said beverage supply system and said second outlet is configured to pass said beverage out of said system; and a source of said gas in communication with said saturation tank.

16. The system of claim 15, wherein a pressure sensor is in communication with said brite tank, wherein said pressure sensor is in communication with a valve configured to control the passage of said beverage from said saturation tank to said brite tank.

17. The system of claim 15, wherein said saturation tank is configured to contain said gas in a head space above said beverage, wherein said saturation tank comprises an inlet connectable to said beverage supply system and configured to permit passage of said beverage into said head space so as to dissolve some of said gas contained in the head space in said beverage.

18. The system of claim 17, further comprising a gas supply system, wherein said gas supply system is configured to transport said gas from said source to said head space.

* * * * *